United States Patent
Kim

(10) Patent No.: US 6,914,646 B2
(45) Date of Patent: Jul. 5, 2005

(54) STRUCTURE FOR PREVENTING A WRINKLE IN A REFLECTIVE SHEET OF A BACKLIGHT UNIT

(75) Inventor: Byoung-Ku Kim, Kumi (KR)

(73) Assignee: L.G.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/428,921

(22) Filed: May 5, 2003

(65) Prior Publication Data

US 2003/0231264 A1 Dec. 18, 2003

Related U.S. Application Data

(63) Continuation of application No. 09/789,840, filed on Feb. 22, 2001, now Pat. No. 6,580,478.

(30) Foreign Application Priority Data

Feb. 24, 2000 (KR) .......................................... 2000-9176

(51) Int. Cl.⁷ ........................... G02F 1/1335; F21V 7/04
(52) U.S. Cl. ........................................... 349/65; 362/31
(58) Field of Search ............................ 349/58, 65, 113; 362/31, 26, 32

(56) References Cited

U.S. PATENT DOCUMENTS

| 5,729,310 | A | * | 3/1998 | Horiuchi et al. | 349/62 |
| 5,966,191 | A | * | 10/1999 | Lee | 349/58 |
| 6,016,175 | A | * | 1/2000 | Kim | 349/58 |
| 6,064,455 | A | * | 5/2000 | Kim | 349/113 |

* cited by examiner

*Primary Examiner*—Toan Ton
(74) *Attorney, Agent, or Firm*—McKenna Long & Aldridge LLP

(57) ABSTRACT

A liquid crystal display device module has a structure for preventing wrinkles in the reflective sheet by providing a means for supporting a light guide plate. In one embodiment, the means includes a supporting member positioned between a supporting frame and a light guide plate. The thickness of the supporting member is larger than that of the reflective sheet, and thus the reflective sheet is prevented from being affected by internal and external heat. Moreover, in one embodiment the supporting frame has a step portion in a peripheral area. The step portion has a step that has a height being larger than the reflective sheet, and thus the reflective sheet is prevented from being affected by internal and external heat, too. Accordingly, wrinkles do not occur in the reflective sheet, and the quality of the LCD module is raised, and thus a liquid crystal display device having good display characteristics can be attained.

7 Claims, 4 Drawing Sheets

STRUCTURE FOR PREVENTING A WRINKLE IN A REFLECTIVE SHEET OF A BACKLIGHT UNIT

This application is a continuation application of Ser. No. 09/789,840 filed on Feb. 22, 2001, now U.S. Pat No. 6,580,478, which is hereby incorporated by reference as if fully set forth herein.

This application claims the benefit of Korean Patent Application No. 2000-9176, filed on Feb. 24, 2000, which is hereby incorporated by reference for all purposes as if fully set forth herein.

BACKGROUND OF THE INVENTION

1. Field of the Invention

The present invention relates to a liquid crystal display (LCD) device, and more particularly, to a structure of a liquid crystal display module having a supporting frame in a backlight device.

2. Discussion of the Related Art

Liquid crystal displays (LCDs) are gaining in popularity for use in systems such as television receivers, computer monitors, avionics displays, aerospace displays, and other military-related displays where the elimination of cathode ray tube (CRT) technology is desirable for several reasons. In particular, CRTs are characterized by large depth dimensions, undesirably high weight, and fragility. Additionally, CRTs require a relatively high voltage power supply in order to sufficiently accelerate electron beams for displaying images.

The aforementioned shortcomings of CRTs are overcome by flat panel liquid crystal displays in which matrix arrays of liquid crystal picture elements or pixels are arranged in a plurality of rows and columns. In general, LCD devices have various advantages in that they are thin, and consume little power, and so on, in comparison with CRT display devices. Therefore, such LCD devices might be expected to be substituted for CRT display devices and have been a matter of great interest in some industry fields.

In contrast to the CRT, the liquid crystal display device requires a light source because the liquid crystal is not fluorescent material. Therefore, as the light source lamp, a cold cathode fluorescent lamp (CCFL), a hot cathode fluorescent lamp (HCFL) or the like is used. Moreover, there are a few kinds of backlight units such as a direct backlight type (or direct type) unit and an edge light type unit.

A direct backlight type surface light source device generally reflects light from a light source onto the back surface of a liquid crystal panel or the like by means of a reflective plate, and diffuses its output light by means of a light diffusing sheet disposed at the light outputting surface side so that the shape of the light source cannot be identified by human eyes. An edge light type surface light source device receives light inputted into it from a light source usually through one side end surface of a plate-shaped light guide means of a transparent acryl resin or the like. The edge light type surface light source device leads the light to a light outputting surface which is the other surface of the light guide means, and therefrom outputs the light to the back surface of a liquid crystal panel or the like. In such a case, in order to improve the efficiency of utilizing light, an optical reflective plate or an optical reflective film is often provided on the opposite surface of the light guide means to the light outputting surface and in order to make the output light uniform, a light diffusing sheet having a light diffusing function is often provided at the light outputting surface side of the light guide means.

The reference is explained hereinafter referring to the edge light type surface light source device.

FIG. 1 is a plan view illustrating a large general LCD module, and FIG. 2 is a cross-sectional view taken along line II—II of FIG. 1. As shown in FIGS. 1 and 2, the LCD module 10 generally includes: a liquid crystal (LC) panel 20 comprising two substrates and an interposed liquid crystal layer; a panel guide 30 guiding the LC panel 20; a TCP (Tape Carrier Package) 28 including integrated circuit (IC) chips 26; a PCB (Printed Circuit Board) 32 connected to the pad of the LC panel 20 through the TCP (Tape Carrier Package) 28; a backlight device 40 positioned under the LC panel 20; a top frame 70 supporting the LC panel 20, and a supporting frame 80. The top frame 70 is made of metallic material, and the supporting frame 80 is made of molded plastic.

The supporting frame 80 holds the liquid crystal display device and houses a reflective sheet 42, a light guide plate 44, a light diffusing sheet 46, a prism sheet 48 and a protection sheet 50. The fluorescent lamp with a diameter of a few millimeters is installed at one or both ends of the light guide plate 44. The light guide plate 44 serves to uniformly direct light from the lamp to the LC panel 20, and it is usually made of a transparent acryl having a thickness of a few millimeters. The light guide plate 44 also has a plurality of convex or concave hole dots or a plurality of V-shaped convex or concave bars in order to uniformly reflect and diffuse the light. The reflective sheet 42 is arranged under the light guide plate 44 and upwardly reflects the light from the light guide plate 44. The prism sheet 48 and light diffusing sheet 46 over the light guide plate 44 can be two or three sheets. The prism sheet 48 and the light diffusing sheet 46 gather or diffuse the light in order to improve the brightness and to increase the range of vision. The protection sheet 50 protects the sheets from particles and from scratches. The protection sheet 50 also prevents the sheets from swinging when conveying the backlight device assembly.

In the LCD module 10 described above, a process of aligning the backlight device 40 to the supporting frame 80 will be explained hereinafter. First, the lamp is installed alongside the supporting frame 80. After that, the reflective sheet 42, which is made of polyester, is assembled in order to reflect the light upward. The light guide plate 44 is then assembled over the reflective sheet 42 in order to uniformly reflect the light irradiated from the lamp. The light diffusing sheet 46, which diffuses the light, and the prism sheet 48, which gathers the light, are assembled. Then, the light guide plate 44 and the sheets are fastened by the tapes, by the air pad, and by the protrusion of the supporting frame 80.

Meanwhile, the number of lamps is increased in the conventional art in order to improve the brightness of the large LCD device, and thus the power consumption increases. However, some problems occur in the LCD device because of the heat from the lamp and from the PCB 32. Thus, in order to solve the problems caused by the heat, the supporting frame 80 is made of the metallic material such as aluminum (Al) that has a good thermal conductivity and a good thermal radiation. And then, the supporting frame 80 is installed in the bottom side of the lamp housing and in the vertical side portion of the lamp housing. Moreover, a heat emitting plate (not shown) is connected to the lamp housing of the backlight device 40 as a means of emitting heat such that heat is emitted from the LCD device.

However, the reflective sheet 42 directly contacting the supporting frame 80 is badly affected by the internal heat from the lamp and PCB 32 and by the external heat occurring in operation and maintenance tests at high temperature, because the internal and external heat is emitted from the supporting frame 80 that is made of metallic material. Especially, wrinkles occur in the reflective sheet 42, and thus there are stains in the display area in an operating mode. Therefore, deterioration of the LCD device arises.

SUMMARY OF THE INVENTION

Accordingly, the present invention is directed to a structure of preventing wrinkle in a reflective sheet of backlight unit that substantially obviates one or more of the problems due to limitations and disadvantages of the related art.

An object of the present invention is to provide an LCD module with a structure that can prevent the reflective sheet from wrinkling.

Another object of the invention is to provide an LCD module that improves picture quality and display characteristics.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display module which includes: a backlight device having a reflective sheet reflecting light from a lamp, a light guide plate positioned over the reflective sheet, and a plurality of sheets located over the light guide plate; a liquid crystal panel located on the backlight device; a first frame located on the liquid crystal panel; a second frame assembled with the first frame interposing the liquid crystal panel and the backlight device; and a supporting member located between the second frame and the light guide plate, the supporting member contacting the light guide plate; wherein a thickness of the supporting member is larger than that of the reflective sheet.

The supporting member is located in the periphery of the second frame and it can be plural. At least two supporting members face each other and correspond in position to each other. Moreover, the supporting member is made of the same material as the reflective sheet, such as PET (Poly Ethylene Terephthalate). The second frame is made of the metallic material.

The principles of the present invention further provide a liquid crystal display module, beneficially including: a backlight device having a reflective sheet reflecting light from a lamp, a light guide plate positioned over the reflective sheet, and a plurality of sheets located over the light guide plate; a liquid crystal panel located on the backlight device; a first frame located on the liquid crystal panel; a second frame assembled with the first frame interposing the liquid crystal panel and the backlight device; wherein the second frame comprises a bottom portion and a step portion having a step, wherein the step portion is located in the periphery of the bottom portion, and wherein a height of the step of the step portion is larger than that of the reflective sheet.

The step portion is beneficially at least two. At least two step portions face each other and correspond in position to each other. The second frame is made of the metallic material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
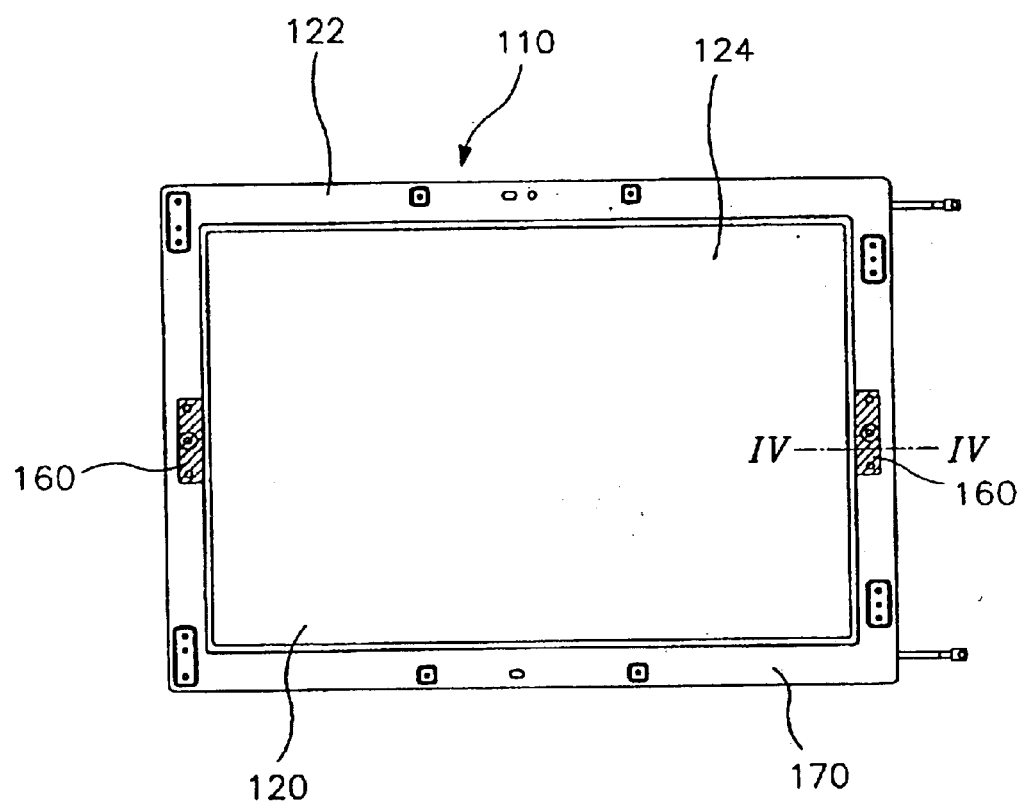
FIG. 3 is a plan view illustrating an LCD module according to a first embodiment.
Figure 4:
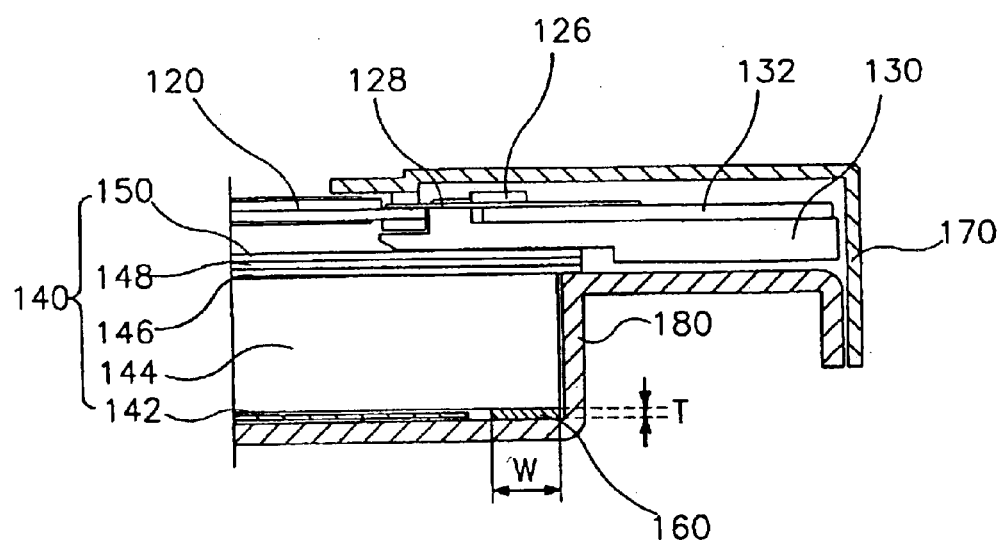
FIG. 4 is a cross-sectional view taken along line IV—IV of FIG. 3.

FIG. 3 is a plan view illustrating an LCD module according to a first embodiment, and FIG. 4 is a cross-sectional view taken along line IV—IV of FIG. 3. As shown in FIGS. 3 and 4, the LCD module 110 generally includes: a liquid crystal (LC) panel 120 comprising two substrates and an interposed liquid crystal layer; a panel guide 130 guiding the LC panel 120; a TCP (Tape Carrier Package) 128 including integrated circuit (IC) chips 126; a PCB (Printed Circuit Board) 132 connected to the pad of the LC panel 120 through the TCP (Tape Carrier Package) 128; a backlight device 140 positioned under the LC panel 120; a top frame 170 supporting the LC panel 120, and a supporting frame 180. The top frame 170 is made of a metallic material. Moreover, the LCD module 10 is divided into the display area 124 and non-display area 122.

The backlight device 140 is comprised of a reflective sheet 142, a light guide plate 144, a light diffusing sheet 146, a prism sheet 148 and a protection sheet 150. The fluorescent lamps facing each other with a diameter of a few millimeters are installed at both ends of the light guide plate 144.

In the structure of the large LCD module 110 described above, the internal heat generated from the lamp and from the PCB 132, and the external heat occurring in operation and maintenance tests at high temperature are emitted from the supporting frame 180 that is made of a metallic material. The reflective sheet 142 of the large LCD module 110 having the above-mentioned structure would be loaded by the large LCD module 110 with a maximum weight of about 5 kilograms. This load would ordinarily closely adhere the reflective sheet 142 to the supporting frame 180 having a high temperature. Therefore, the reflective sheet 142 would be greatly affected by the heat emitted from the supporting frame 180 and by the load exerted by the large LCD module 110. And thus, the load and the heat cause the wrinkles in the reflective sheet 142.

Figure 7:
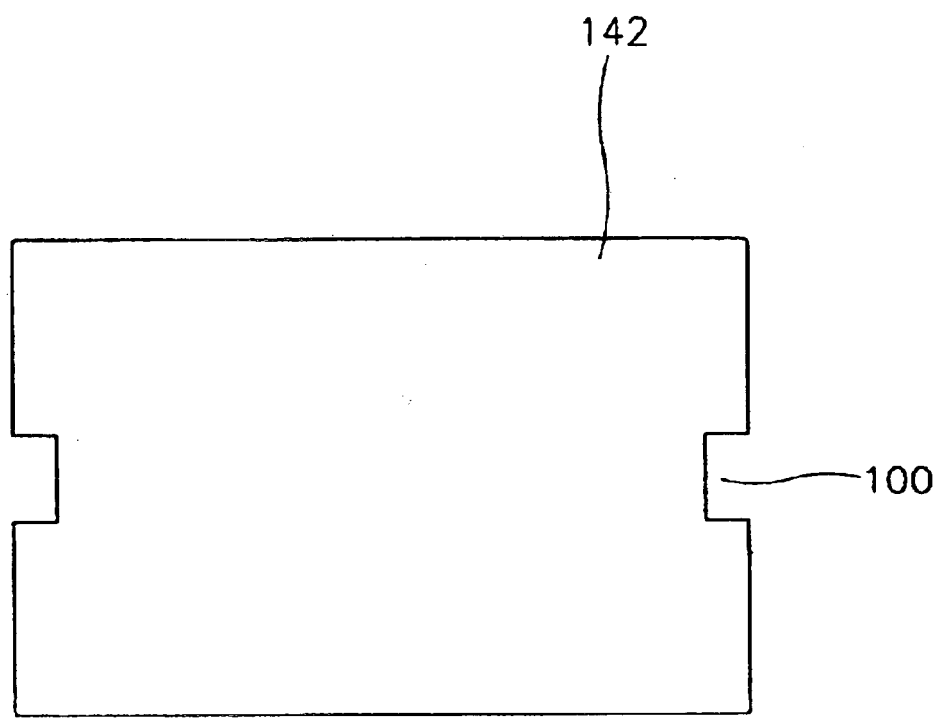
FIG. 7 is a plan view illustrating a reflective sheet according to a preferred embodiment.

For the purpose of suppressing the effect of the heat and the load on the reflective sheet 142, a supporting member 160 having a bar shape is formed in the non-display area 122 between the light guide plate 144 and the supporting frame 180. The supporting member 160 is made of the same material as the reflective sheet 142, such as PET (Poly Ethylene Terephthalate). The thickness "T" of the supporting member 160 is larger than that of the reflective sheet 142, and the width "W" of the supporting member 160 is not wider than that of the non-display area 122, and thus the supporting member 160 does not affect the display area 124. Accordingly, the supporting member 160 creates a gap between the light guide plate 144 and the supporting frame 180. One reason for making the supporting member 160 of the same material as the reflective sheet 142 is that the supporting member 160 acts as a reflector like the reflective sheet 142. The supporting member 160 beneficially has planar surfaces at both top and bottom sides thereof. There are beneficially two supporting members 160 as shown in FIG. 3, but the number of the supporting members 160 can be only one. Moreover, the supporting member 160 can be arranged at any position where the supporting member 160 can support the light guide plate 144. Above all, it is recommended that at least two supporting members 160 facing each other support the light guide plate 144 in the non-display area 122 as shown in FIG. 3. At this time, the reflective sheet 142 beneficially has bent shapes, or cut-outs, 100 at both right and left peripheral portions as shown in FIG. 7. Thus, the supporting members 160 are positioned in these bent shapes, or cut-outs, 100.

The gap caused by the thickness "T" of the supporting member 160 minimizes the effect of the heat that is emitted from the supporting frame 180, and thus the gap prevents the thermal conduction from the supporting frame 180 to the reflective sheet 142. Moreover, because of the gap formed by the supporting member 160, the weight that is exerted by the LCD module 110 is not applied to the reflective sheet 142, in contrast to the conventional art. That gap also minimizes the effect of the radiant heat, which is radiated from the supporting frame 180, into the reflective sheet 142. Accordingly, the wrinkles are prevented from occurring in the reflective sheet 142. And thus, the stains in the display area do not occur in operating mode.

Figure 5:
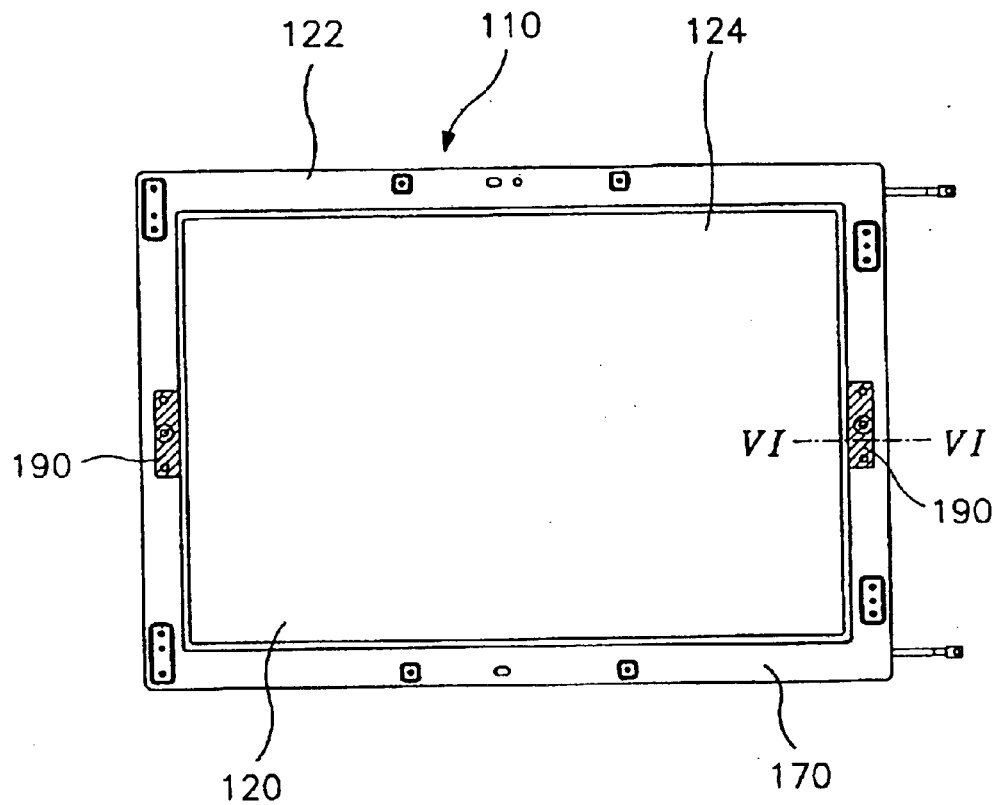
FIG. 5 is a plan view illustrating an LCD module according to a second embodiment.
Figure 6:
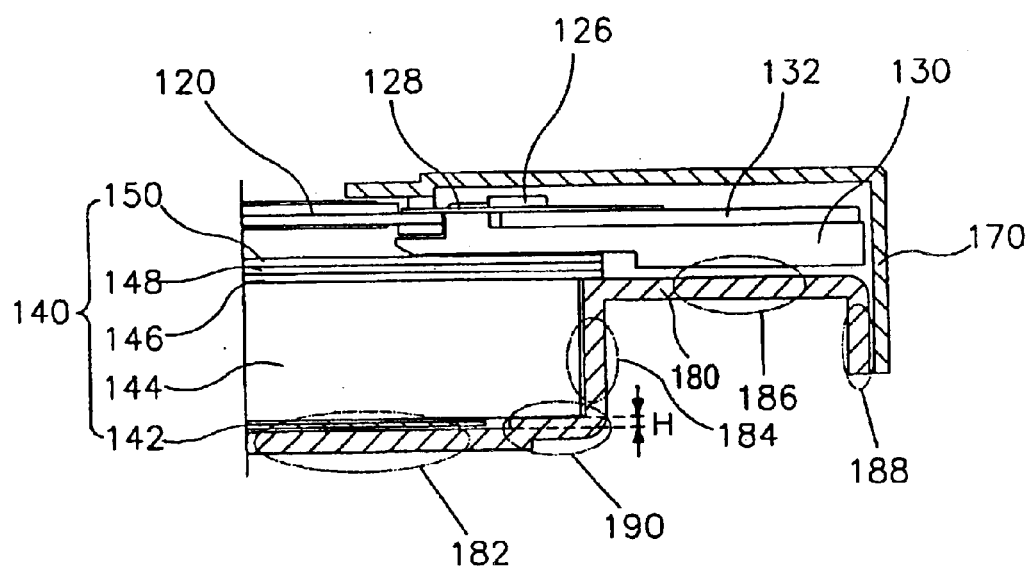
FIG. 6 is a cross-sectional view taken along line VI—VI of FIG. 5.

FIG. 5 is a plan view illustrating an LCD module according to a second embodiment, and FIG. 6 is a cross-sectional view taken along line VI—VI of FIG. 5. The second embodiment is similar to the first embodiment, but has a transformed supporting frame 180. As shown in FIGS. 5 and 6, the LCD module 110 generally includes: a liquid crystal (LC) panel 120 comprising two substrates and an interposed liquid crystal layer; a panel guide 130 guiding the LC panel 120; a TCP (Tape Carrier Package) 128 including integrated circuit (IC) chips 126; a PCB (Printed Circuit Board) 132 connected to the pad of the LC panel 120 through the TCP (Tape Carrier Package) 128; a backlight device 140 positioned under the LC panel 120; a top frame 170 supporting the LC panel 120, and a supporting frame 180. The top frame 170 is made of a metallic material. Moreover, the LCD module 110 is divided into the display area 124 and non-display area 122.

The backlight device 140 is comprised of a reflective sheet 142, a light guide plate 144, a prism sheet 148, a light diffusing sheet 146 and a protection sheet 150. The fluorescent lamps facing each other with a diameter of a few millimeters are installed at both end of the light guide plate 144.

Figure 1:
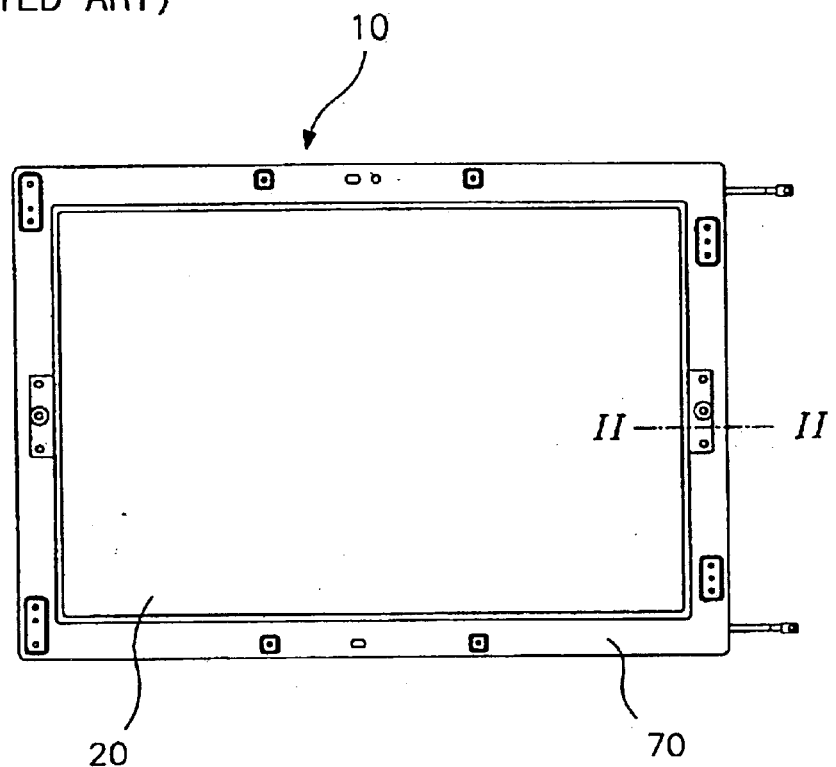
FIG. 1 is a plan view illustrating a large LCD module according to a conventional art.
Figure 2:
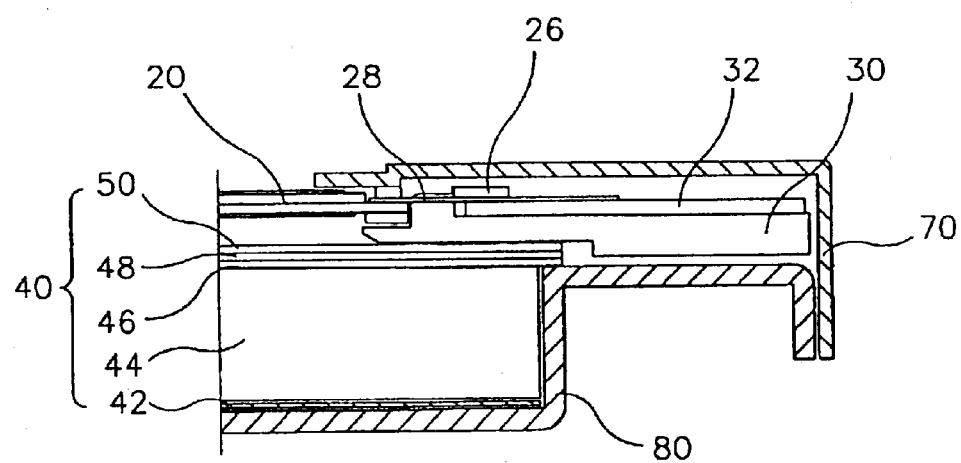
FIG. 2 is a cross-sectional view taken along line II—II of FIG. 1.

The supporting frame 180, as shown in FIG. 6, comprises: a bottom portion 182 that is positioned under the light guide plate 144 and that is parallel to the light guide plate 144; a first side portion 184 that is extended in the upward direction from the bottom portion 182 to the panel guide 130, in order to house the light guide plate 144; a top portion 186 that is parallel to the panel guide 130; and a second side portion 188 that is extended from the top portion 186 and that contacts the side portion of the top frame 170. Moreover, the supporting frame 180 further comprises a step portion 190 at the corner of the bottom portion 182 and the first side portion 184, in contrast to the conventional art supporting frame that is shown in FIG. 2.

The step portion 190 is beneficially formed at the periphery of the bottom portion 182 of the Supporting frame 180. The height "H" of the step of the step portion 190 is larger than the thickness of the reflective sheet 142, and the width of the step of the step portion is not wider than that of the non-display area 122, and thus the step portion 190 of the supporting frame 180 does not affect the display area 124. Moreover, there can be plural step portions 190. Among these plural step portions, beneficially at least two step portions face each other and correspond in position to each other.

Accordingly, the step of the step portion 190 creates a gap between the light guide plate 144 and the bottom portion 182 of the supporting framed 180. As mentioned above with respect to the first embodiment, the gap formed by the height "H" of the step of the step portion 190 between the reflective sheet 142 and the supporting frame 180 prevents the thermal conduction from the supporting frame 180 to the reflective sheet 142. Moreover, because the step of the step portion 190 supports the load from the LCD module, the weight that is exerted by the LCD module is not applied to the reflective sheet 142, in contrast to the conventional art. Namely, the step of the step portion 190 prevents the reflective sheet 142 from being loaded by the LCD module. The gap formed by the step of the step portion 190 also minimizes the effect of radiant heat, which is radiated from the supporting frame 180, into the reflective sheet 142. Accordingly, wrinkles are prevented from occurring in the reflective sheet 142. And thus, the stains in the display area do not occur in an operating mode.

As described herein, by employing structures for preventing wrinkles in the reflective sheet, a liquid crystal display device having good display characteristics can be attained. Namely, because of preventing the reflective sheet from being affected by internal heat from the lamp or PCB, and by external heat occurring in operating and maintenance test in high temperature, the wrinkles in the reflective sheet do not occur. And thus, the quality of the LCD module is raised.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display module, comprising:
   a liquid crystal display panel;
   a first frame located above the liquid crystal display panel;
   a second frame located beneath the liquid crystal display panel, the second frame having a bottom portion and an elevated step portion; and
   a backlight device disposed between the liquid crystal panel and the second frame, said backlight device comprising, a reflective sheet reflecting light from a lamp and disposed above the bottom portion of the second frame, a light guide plate positioned over the reflective sheet and contacting the elevated step portion of the second frame, and a plurality of sheets located between the light guide plate and the liquid crystal display panel, wherein the elevated step portion forms a gap between the light guide plate and the bottom portion of the second frame.

2. The liquid crystal display module of claim 1, further comprising a panel guide disposed between the plurality of sheets of the backlight device and the liquid crystal display panel.

3. A liquid crystal display module, comprising:

a backlight device having
 a) a reflective sheet reflecting light from a lamp,
 b) a light guide plate positioned over the reflective sheet, and
 c) a plurality of sheets located over the light guide plate;

a liquid crystal panel located on the backlight device;

a first frame located on the liquid crystal panel;

a second frame assembled with the first frame, the liquid crystal panel and the backlight device interposed between the first frame and the second frame;

wherein the second frame comprises a bottom portion and a step portion having a step, wherein the step portion is located in a periphery area of the second frame, wherein a height of the step of the step portion is larger than a height of the reflective sheet; wherein the light guide plate contacts the step portion, and wherein the step portion forms a gap between the light guide plate and the bottom portion of the second frame.

4. The liquid crystal display module of claim 3, wherein the second frame further comprises at least one additional step portion.

5. The liquid crystal display module of claim 4, wherein at least two step portions are located on opposite sides of the second frame.

6. The liquid crystal display module of claim 5, wherein the at least two step portions correspond in position to each other on the opposite sides of the second frame.

7. The liquid crystal display module of claim 3, wherein the second frame is made of a metallic material.

* * * * *